UNITED STATES PATENT OFFICE.

REINHARDT RAHR, OF MANITOWOC, WISCONSIN.

PROCESS OF MAKING CARAMEL MALT.

SPECIFICATION forming part of Letters Patent No. 491,813, dated February 14, 1893.

Application filed June 15, 1892. Serial No. 436,835. (No specimens.)

*To all whom it may concern:*

Be it known that I, REINHARDT RAHR, of Manitowoc, in the county of Manitowoc and State of Wisconsin, have invented certain new and useful Improvements in the Process of Making Caramel Malt, of which the following is a specification.

In the manufacture of beer it is sometimes desirable to impart a dark color to the wort.
Heretofore this has usually been done by adding a small quantity of so-called "coloring malt" to the mash; or by adding a small quantity of burnt sugar (caramel) to the wort while in the kettle. Both of these methods have the serious objection that they impart to the finished beer the disagreeable and objectionable empyreumatic taste or flavor of the coloring matter which has been added. I have discovered that by treating malt in a peculiar manner I produce within the malt kernel itself and out of the constituents of the malt, a coloring matter which will produce the desired color, and at the same time improve the beer by imparting an agreeable flavor instead of the objectionable flavor due to coloring agents heretofore employed.

During the process of malting barley, certain definite chemical and physical changes take place within the barley corn, which I will describe in a general way as follows:

There is contained within the barley corn, besides the so-called albuminoids (soluble and insoluble) a comparatively large quantity of starch ($C_6H_{10}O_5$).

The object of the process of malting is— first—to bring about a solution or partial solution of the insoluble albuminoids; second; to bring about the formation or development within the malt of a new substance, viz.—
diastase; third, to bring about such a chemical as well as a physical change of the starch granules, as to prepare them in a fit condition to be subsequently acted upon by the diastase. This subsequent action of the diastase upon the unconverted starch takes place during the process of mashing, and takes place only under certain definite and favorable conditions of temperature and moisture. During this process of mashing, the diastase acts upon the starch chemically, by converting it into maltose.

Now, my process consists in, first, bringing about within the malt kernel itself, the same chemical changes that take place during the process of mashing, *i. e.* a complete conversion of the starch products into malt sugar or maltose; and, second, converting the entire amount of maltose contained within the malt kernel into caramel, all of which I do within the kernel itself.

I practice my invention as follows: I take well prepared malt, and after thoroughly cleaning the same, so as to remove all small kernels and impurities, I soak or steep it in cold water for a period of twenty-four to thirty-six hours, depending on the temperature of the water, and the size of the malt kernels. During this process there are but very slight if any chemical changes taking place. I next subject the steeped malt to a low degree of heat, either by the application of steam or by the gradual application of fire in suitable vessels constructed for that purpose, until the temperature of the malt has reached about 60° Reaumur. I retain this temperature until complete conversion of the starch products into maltose or malt sugar has taken place, presumably according to the equation following:

$$4C_6H_{10}O_5 + 2H_2O = C_{18}H_{34}O_{17} + C_6H_{10}O_5.$$

The length of time necessary for conversion of the starch products into maltose at the temperature stated will vary considerably according to the condition and quality of the malt. I have found that this time varies from about one hour to three hours. I now continue the process by subjecting the converted malt to a higher degree of temperature, by the application of fire, doing this in a roaster adapted for the purpose. I retain the increased temperature during a period of about three hours, after which the maltose is converted into caramel, which state can readily be recognized by the physical properties and characteristics of the malt.

The improved product of the process above described I call "caramalt," and this product is used in the manufacture of beer, being mixed with the malt in suitable proportions, to impart the desired color to the wort.

It will be understood that my process is capable of variation as to the temperatures employed and the length of time the malt is subjected either in the first or second steps of the process to the action of heat.

I have found the treatment above described to be well adapted to produce a superior product for coloring wort without adding any disagreeable or undesirable flavor thereto, but, on the contrary, improving the beer by adding an agreeable flavor thereto.

I claim—

The process of making caramel malt which consists in soaking or steeping the malt kernels in water, separating them from the water, then subjecting the malt to a low degree of dry heat, gradually raising the temperature of the malt to about 60° Reaumur and maintaining said temperature until the starch products are converted into maltose, and finally raising the temperature to a point short of carbonization and continuing the application of the elevated temperature until the maltose has been converted into caramel, substantially as described.

REINHARDT RAHR.

Witnesses:
WILLIAM RAHR,
F. A. MILLER.